(12) United States Patent
Sakamoto et al.

(10) Patent No.: US 10,854,930 B2
(45) Date of Patent: Dec. 1, 2020

(54) STABILIZATION COATINGS FOR SOLID STATE BATTERIES

(71) Applicant: The Regents of The University of Michigan, Ann Arbor, MI (US)

(72) Inventors: Jeffrey Sakamoto, Ann Arbor, MI (US); Travis Thompson, Ann Arbor, MI (US); Nathan Taylor, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 64 days.

(21) Appl. No.: 15/727,758

(22) Filed: Oct. 9, 2017

(65) Prior Publication Data

US 2018/0102571 A1    Apr. 12, 2018

Related U.S. Application Data

(60) Provisional application No. 62/405,515, filed on Oct. 7, 2016.

(51) Int. Cl.
*H01M 10/42* (2006.01)
*H01M 10/052* (2010.01)
(Continued)

(52) U.S. Cl.
CPC ..... *H01M 10/4235* (2013.01); *H01M 10/052* (2013.01); *H01M 10/058* (2013.01);
(Continued)

(58) Field of Classification Search
CPC .......... H01M 10/052; H01M 10/0525; H01M 10/0562; H01M 10/0585; H01M 10/4235; H01M 2300/0071; H01M 2300/0094
See application file for complete search history.

(56) References Cited

U.S. PATENT DOCUMENTS 6,432,586 B1    8/2002 Zhang
7,087,348 B2    8/2006 Holman et al.
(Continued)

FOREIGN PATENT DOCUMENTS

EP    2696353 A1    2/2014
EP    2717364 A1    4/2014
(Continued)

OTHER PUBLICATIONS

Fu, et al., Flexible, Solid-State, Ion-Conducting Membrane with 3D Garnet Nanofiber Networks for Lithium Batteries, PNAS, 2016, 113(26)7094-7099.
(Continued)

*Primary Examiner* — Adam A Arciero
(74) *Attorney, Agent, or Firm* — Quarles & Brady LLP

(57) ABSTRACT

The present disclosure relates to a method for forming solid-state electrolytes, electrodes, current collectors, and/or conductive additives used in solid-state batteries. In one version, the method includes depositing a stabilization coating on a powdered electrolyte material, or a powdered electrode material, or a powdered conductive additive material and forming a slurry comprising the coated material. The slurry is then cast on a surface to form a layer, and the layer is sintered to form a solid state electrolyte, or an electrode, or an electrode having the conductive additive.

19 Claims, 10 Drawing Sheets

(51) Int. Cl.
*H01M 10/0525* (2010.01)
*H01M 10/0562* (2010.01)
*H01M 10/058* (2010.01)
*H01M 10/0585* (2010.01)

(52) U.S. Cl.
CPC ... *H01M 10/0525* (2013.01); *H01M 10/0562* (2013.01); *H01M 10/0585* (2013.01); *H01M 2300/0071* (2013.01); *H01M 2300/0094* (2013.01)

(56) References Cited

U.S. PATENT DOCUMENTS

| | | | |
|---|---|---|---|
| 7,338,734 | B2 | 3/2008 | Chiang et al. |
| 8,092,941 | B2 | 1/2012 | Weppner et al. |
| 8,182,943 | B2 | 5/2012 | Visco et al. |
| 8,202,649 | B2 | 6/2012 | Visco et al. |
| 8,405,957 | B2 | 3/2013 | Katayama et al. |
| 8,658,317 | B2 | 2/2014 | Weppner et al. |
| 8,735,003 | B2 † | 5/2014 | Kim |
| 8,841,033 | B2 | 9/2014 | Yamamura et al. |
| 8,962,188 | B2 | 2/2015 | Zhamu et al. |
| 8,999,571 | B2 | 4/2015 | Chiang et al. |
| 9,184,443 | B2 | 11/2015 | Lee et al. |
| 9,543,565 | B2 | 1/2017 | Voelker et al. |
| 9,653,735 | B2 | 5/2017 | Skotheim et al. |
| 2003/0003364 | A1* | 1/2003 | Mori ............... H01M 4/0435 429/231.95 |
| 2011/0111298 | A1 | 5/2011 | Lopez et al. |
| 2014/0099538 | A1* | 4/2014 | Johnson ............ H01M 4/134 429/211 |
| 2014/0287305 | A1 † | 9/2014 | Wachsman |
| 2014/0377665 | A1 | 12/2014 | Yoshida et al. |
| 2016/0020487 | A1* | 1/2016 | Yamada ............ H01M 4/13 429/304 |
| 2016/0218349 | A1* | 7/2016 | Hasegawa ........ H01M 4/131 |
| 2016/0248118 | A1* | 8/2016 | Chan ............... H01M 10/0562 |
| 2016/0351973 | A1* | 12/2016 | Albano ............ H01M 4/366 |
| 2017/0170515 | A1 † | 6/2017 | Yushin |

FOREIGN PATENT DOCUMENTS

| | | | |
|---|---|---|---|
| WO | 2016069749 | A1 | 5/2016 |
| WO | 2016/196688 | A1 † | 12/2016 |
| WO | 2016196688 | A1 | 12/2016 |
| WO | 2017/156130 | A1 † | 9/2017 |
| WO | 2017156130 | A1 | 9/2017 |

OTHER PUBLICATIONS

Jin, Processing and Characterization of Secondary Solid-State Li-Ion Batteries, A Dissertation Submitted to the University of Notre Dame, Apr. 2013, 128 pages.
Mukhopadhyay, et al., Structure and Stoichiometry in Supervalent Doped Li7La3Zr2O12, Chemistry of Materials, 2015, 27(10):3658-3665.
Murugan, et al., Fast Lithium Ion Conduction in Garnet-Type Li7La3Zr2O12, Angew. Chem. Int. Ed., 2007, 46:7778-7781.
Rangasamy, et al., The Effect of 24c-site (A) Cation Substitution on the Tetragonal-Cubic Phase Transition in Li7_xLa3_xAxZr2O12 Garnet-Based Ceramic Electrolyte, Journal of Power Sources, 2013, 230:261-266.
Thangadurai, et al., Li6ALa2Ta2O12 (A=Sr, Ba): Novel Garnet-Like Oxides for Fast Lithium Ion Conduction, Advanced Functional Materials, 2005, 15(1):107-112.
Thangadurai, et al., Recent Progress in Solid Oxide and Lithium Ion Conducting Electrolytes Research, Ionics, 2006, 12:81-92.
Thompson, et al., A Tale of Two Sites: On Defining the Carrier Concentration in Garnet-Based Ionic Conductors for Advanced Li Batteries, Advanced Energy Materials, 2015, 1500096, 9 pages.
Wang, et al., Design Principles for Solid-State Lithium Supersonic Conductors, Nature Materials, 2015, 14(10):1026-1031.
Xu, et al., Mechanisms of Li+ Transport in Garnet-Type Cubic Li3+xLa3M2O12 (M=Te, Nb, Zr), Physical Review B, 2012, 85:052301, 5 pages.
PCT International Search Report and Written Opinion, PCT/US2017/055704, dated Jan. 25, 2018, 10 pages.

* cited by examiner
† cited by third party

STABILIZATION COATINGS FOR SOLID STATE BATTERIES

CROSS-REFERENCES TO RELATED APPLICATIONS

This application claims priority to U.S. Patent Application No. 62/405,515 filed Oct. 7, 2016.

STATEMENT REGARDING FEDERALLY SPONSORED RESEARCH

Not Applicable.

BACKGROUND OF THE INVENTION

1. Field of the Invention

This invention relates to electrochemical devices, such as lithium ion battery electrodes, lithium ion conducting solid-state electrolytes, and solid-state lithium ion batteries including these electrodes and solid-state electrolytes. This invention also relates to methods for making such electrochemical devices.

2. Description of the Related Art

Lithium ion (Li-ion) battery technology has advanced significantly and has a market size projected to be $10.5 billion by 2019. Current state of the art lithium ion batteries comprise two electrodes (an anode and a cathode), a separator material that keeps the electrodes from touching but allows $Li^+$ ions through, and an electrolyte (which is an organic liquid with lithium salts). During charge and discharge, $Li^+$ ions are exchanged between the electrodes.

State-of-the-art Li-ion technology is currently used in low volume production plug-in hybrid and niche high performance vehicles; however, widespread adoption of electrified powertrains requires 25% lower cost, four times higher performance, and safer batteries without the possibility of fire. Thus, future energy storage demands safer, cheaper and higher performance means of energy storage.

One strategy is to develop solid state batteries, where the liquid electrolyte is replaced with a solid material that is conductive to $Li^+$ ions and can offer 3-4 times the energy density while reducing the battery pack cost by about 20%. Despite these attractive features, the fabrication and testing of solid state batteries for bulk scale applications, such as electric vehicles, has not been demonstrated. The primary challenge associated with solid state batteries is the development of new manufacturing techniques for thin ceramic layers and the assembly of these layers into new cell architectures.

Currently, the liquid electrolyte used in state of the art (SOA) Li-ion batteries is not compatible with advanced battery concepts, such as the use of a lithium metal anode or high voltage cathodes. Furthermore, the liquid utilized in SOA Li-ion batteries is flammable and susceptible to combustion upon thermal runaway. The use of a solid electrolyte to replace the liquid used in the SOA enables advanced cell chemistries while simultaneously eliminating the risk of combustion. Several solid-electrolytes have been identified including nitrogen doped lithium phosphate (LiPON) or sulfide based glasses, and companies have been formed to commercialize these types of technologies. While progress has been made towards the performance of cells of these types, large scale manufacturing has not been demonstrated since LiPON must be vapor deposited and sulfide glasses form toxic $H_2S$ upon exposure to ambient air. Thus, special manufacturing techniques are required for those systems.

Super conducting oxides (SCO) have also been proposed for use in a solid-state electrolyte. Although several oxide electrolytes are reported in the literature, selection of a particular material is not trivial since several criteria must be simultaneously satisfied. The following metrics were identified on a combination of the SOA Li-ion battery technology baseline: (1) conductivity>0.2 mS/cm, comparable to SOA Li-ion battery technology, (2) negligible electronic conductivity, (3) electrochemical stability against high voltage cathodes and lithium metal anodes, (4) high temperature stability, (5) reasonable stability in ambient air and moisture, and (6) ability to be manufactured at a thicknesses of <50 microns. Until recently, no SCO simultaneously met the above criteria.

In 2007, high Li ion conductivity in the garnet family of super conducting oxides was identified [see, Thangadurai, et al., *Adv. Funct. Mater.* 2005, 15, 107; and Thangadurai, et al., *Ionics* 2006, 12, 81], maximizing with the SCO garnet based on $Li_7La_3Zr_2O_{12}$ (LLZO) [see, Murugan, et al., *Angew. Chem. Inter. Ed.* 2007, 46, 7778]. Since then, it has been shown that LLZO can meet all of the criteria necessary for a solid-electrolyte outlined above.

Several compositions in the garnet family of materials are known to exhibit Li-ion conduction with the general formula $Li_{3+a}M_2Re_3O_{12}$ (where a=0-3, M=a metal with +4, +5, or +6 valence, and Re=a rare earth element with a +3 valence) [see, Xu, et al., *Phys. Rev. B* 2012, 85, 052301]. T. Thompson, A. Sharafi, M. D. Johannes, A. Huq, J. L. Allen, J. Wolfenstine, J. Sakamoto, *Advanced Energy Materials* 2015, 11, 1500096, identified which compositions, based on Li content, exhibit maximal Li-ionic conductivity. LLZO is a particularly promising family of garnet compositions. Several strategies for increasing the conductivity of LLZO including: (1) doping with elements such as Al, Fe, Y, Ga, Ba, and Ca, and (2) forming solid solutions with other garnet families such as LLTO ($Li_5La_3Ta_2O_{12}$) and LLNO ($Li_5La_3Nb_2O_{12}$) have been identified [see Thompson, et al., *Advanced Energy Materials* 2015, 11, 1500096]. Both of the mechanisms mentioned (doping and solid solutions) rely on substitution on the Li and/or M site. Substitution on the Re site has also been attempted [see, E. Rangasamy, J. Wolfenstine, J. L. Allen, J. Sakamoto, *Journal of Power Sources* 2013, 230, 261] but both experimental and computational previous reports suggest this site is especially stable and has met limited success [see, S. Mukhopadhyay, T. Thompson, J. Sakamoto, A. Huq, J. Wolfenstine, J. L. Allen, N. Bernstein, D. A. Stewart, M. D. Johannes, *Chemistry of Materials* 2015, 27, 3658.].

The electrolyte in a solid-state battery has demanding requirements and materials based on the garnet crystal structure show the most promise. However, due to compositional flexibility of the crystal structure preventing reaction during high temperature processing, binding the layers is not trivial.

SUMMARY OF THE INVENTION

The present invention provides methods of applying metal oxide coatings to stabilize the interfaces between the active material, conductive additive, solid electrolyte, and current collector in a composite solid-state battery electrode. From the above discussion, it is evident that a large number of elements can be substituted on the garnet crystal structure. Similarly, Li-ion cathode and anode materials can be comprised of several cations, including dopants. Finally, the conductive additive can be comprised of carbons, metals, or other ceramic phases. Thus, many cations mixed together in a composite cathode structure complicates the fabrication during sintering. Often, the discrete mixture of phases formed before sintering react with each other changing the electrochemical properties of the composite cathode after sintering. Therefore, over-chemical reaction of the composite electrode constituents must be avoided. However, a complete lack of chemical reaction between the constituents would result in poor electrochemical interfaces. Thus, a balance in the chemical reaction between the composite cathode constituents must be achieved. The application of a coating material to stabilize interfaces by slowing, but not eliminating, the chemical reactions that will occur at elevated temperatures is the focus of this invention disclosure.

In one aspect, the invention provides a method for forming a lithium ion conducting solid-state electrolyte from a powdered material. The method includes the steps of: (a) depositing a stabilization coating on a powdered electrolyte material; (b) forming a slurry comprising the coated electrolyte material; (c) casting the slurry on a surface to form a layer; and (d) sintering the layer to form the solid-state electrolyte.

In another aspect, the invention provides a method for forming a lithium ion conducting solid-state electrolyte from a slurry. The method includes the steps of: (a) forming a slurry comprising a solid-electrolyte material and a stabilization coating material; (b) casting the slurry on a surface to form a layer; (c) sintering the layer to form the solid-state electrolyte.

The invention also includes a method for forming a lithium ion conducting solid state electrolyte from a dried tape. The method includes the steps of: (a) forming a slurry comprising a solid-electrolyte material; (b) casting the slurry on a surface to form a layer; (c) sintering the layer; (d) depositing a stabilization coating on the sintered layer to form the solid-state electrolyte.

The invention further provides a method for forming a lithium-ion conducting solid-state electrolyte from a slurry. The method includes the steps of: (a) forming a slurry comprising a solid electrolyte material; (b) casting the slurry on a surface to form a layer; (c) depositing a stabilization coating on the layer; and (d) sintering the layer to form the solid-state electrolyte.

In another aspect, the invention provides a method for forming an electrode for an electrochemical device from a powder. The method includes steps of: (a) depositing a stabilization coating on a powdered lithium host material; (b) forming a slurry comprising the coated lithium host material; (c) casting the slurry on a surface to form a layer; and (d) sintering the layer to form the electrode.

Furthermore, the invention provides a method for forming an electrode for an electrochemical device from a slurry. The method includes steps of: (a) forming a slurry comprising a lithium host material and a stabilization coating material; (b) casting the slurry on a surface to form a layer; (c) sintering the layer to form the electrode.

The invention also provides a method for forming an electrode for an electrochemical device from a sintered layer. The method includes steps of: (a) forming a slurry comprising a lithium host material; (b) casting the slurry on a surface to form a layer; (c) sintering the layer; (d) depositing a stabilization coating on the sintered layer to form the electrode.

The invention further provides a method for forming an electrode for an electrochemical device. The method includes: (a) forming a slurry comprising a lithium host material; (b) casting the slurry on a surface to form a layer; (c) depositing a stabilization coating on the layer; (d) sintering the layer to form the electrode.

In another aspect, the invention provides a method for coating a current collector for an electrochemical device. The steps of the method include: (a) depositing a stabilization coating material onto the current collector; and (b) heating the coated current collector to form a stabilized current collector.

In another aspect, the invention provides a method for assembling an electrochemical device. The steps include (a) casting a first slurry on a surface to form a first layer, wherein the first slurry comprises a lithium host material; (b) casting a second slurry on the first layer to form a second layer on the first layer, wherein the second slurry comprises a solid electrolyte material; (c) casting a third slurry on the second layer to form a third layer on the second layer thereby creating a layered structure of the first layer, the second layer and the third layer, wherein the third slurry comprises a second lithium host material; and (d) sintering the layered structure to form the electrochemical device, wherein at least one of the first lithium host material, the solid-state electrolyte material, and the second lithium host material are pre-coated with a stabilization coating material.

The invention also provides another method for assembling an electrochemical device. The steps of the method include: (a) casting a first slurry on a surface to form a first layer, wherein the first slurry comprises a first lithium host material; (b) casting a second slurry on the first layer to form a second layer on the first layer, wherein the second slurry comprises a solid electrolyte material; (c) casting a third slurry on the second layer to form a third layer on the second layer thereby creating a layered structure of the first layer, the second layer and the third layer, wherein the third slurry comprises a second lithium host material; (d) sintering the layered structure to form the electrochemical device, where at least one of the first slurry, the second slurry, and the third slurry comprises a stabilization coating material.

In another aspect, this invention provides a method of forming a conductive additive for an electrochemical device. The method includes the steps of (a) depositing a stabilization coating material onto a conductive material; and (b) sintering the coated conductive material in a composite electrode or electrochemical device.

In another aspect, this invention provides a lithium ion conducting solid-state electrolyte. The electrolyte comprises a solid electrolyte material, and a stabilization coating on the solid electrolyte material. The coating can comprise one or more oxides selected from boron oxide, lithium boron oxide, zinc oxide, magnesium oxide, phosphorus oxide, strontium oxide, calcium oxide, barium oxide, yttrium oxide, or silicon oxide.

Furthermore, the invention provides an electrode for an electrochemical device. The electrode may comprise a lithium host material, and a stabilization coating on the electrode. The coating can comprise one or more oxides selected from boron oxide, lithium boron oxide, zinc oxide, magnesium oxide, phosphorus oxide, strontium oxide, calcium oxide, barium oxide, yttrium oxide, or silicon oxide.

In another aspect, this invention provides a conductive additive for an electrode of an electrochemical device. The conductive additive comprises a conductive material having a stabilization coating.

In another aspect, this invention provides an electrochemical device comprising a current collector comprising a conductive substrate material having a stabilization coating.

In another aspect, this invention provides an electrochemical device comprising an electrode including a solid electrolyte material incorporated therein, the solid electrolyte material having a stabilization coating on the solid electrolyte material, the stabilization coating comprising one or more oxides selected from boron oxide, lithium boron oxide, zinc oxide, magnesium oxide, phosphorus oxide, strontium oxide, calcium oxide, barium oxide, yttrium oxide, or silicon oxide.

These and other features, aspects, and advantages of the present invention will become better understood upon consideration of the following detailed description, drawings and appended claims.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. Skilled artisans will recognize the examples provided herein have many useful alternatives and fall within the scope of embodiments of the invention.

The present invention provides methods for applying a stabilization coating materials to electrodes, solid-state electrolytes, current collectors, and/or conductive additives used in composite solid-state battery electrodes. Furthermore, this invention provides formulations for stabilized electrodes and solid-state electrolytes.

As used herein, the term "stabilization coating" means a coating on a constituent in which the constituent is designed to be sintered to at least one other constituent (which may be the same or different), wherein the coating slows but does not eliminate, diffusion of the constituent into or chemical reactions of the constituent with the other constituent(s). For example, the stabilization coating may act as a diffusion inhibitor to prevent undesirable changes in electrochemical properties caused by high levels of interdiffusion of the constituents with one another, while still enabling the formation of a sinter bond among the constituents.

Figure 1:
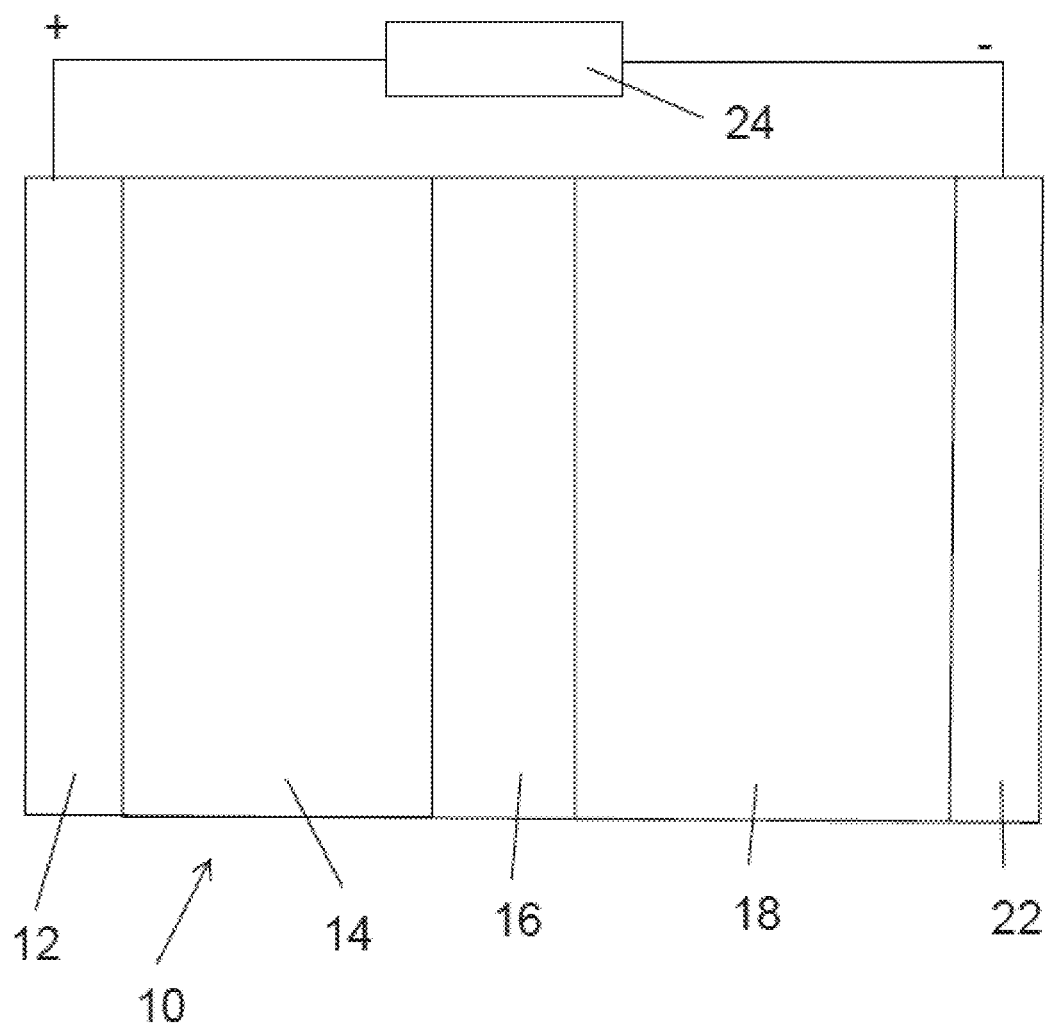
FIG. 1 is a schematic of a lithium ion battery.

FIG. 1 shows a non-limiting example application of a lithium ion battery 10 according to one embodiment of the present disclosure. The lithium ion battery 10 includes a first current collector 12 (e.g., aluminum) in contact with a cathode 14. A solid state electrolyte 16 is arranged between the cathode 14 and an anode 18, which is in contact with a second current collector 22 (e.g., aluminum). The first and second current collectors 12 and 22 of the lithium ion battery 10 may be in electrical communication with an electrical component 24. The electrical component 24 could place the lithium ion battery 10 in electrical communication with an electrical load that discharges the battery or a charger that charges the battery.

A suitable active material for the cathode 14 of the lithium ion battery 10 is a lithium host material capable of storing and subsequently releasing lithium ions. An example cathode active material is a lithium metal oxide wherein the metal is one or more aluminum, cobalt, iron, manganese, nickel and vanadium. Non-limiting example lithium metal oxides are $LiCoO_2$ (LCO), $LiFeO_2$, $LiMnO_2$ (LMO), $LiMn_2O_4$, $LiNiO_2$ (LNO), $LiNi_xCo_yO_2$, $LiMn_xCo_yO_2$, $LiMn_xNi_yO_2$, $LiMn_xNi_yO_4$, $LiNi_xCo_yAl_zO_2$, $LiNi_{1/3}Mn_{1/3}Co_{1/3}O_2$ and others. Another example of cathode active materials is a lithium-containing phosphate having a general formula $LiMPO_4$ wherein M is one or more of cobalt, iron, manganese, and nickel, such as lithium iron phosphate (LFP) and lithium iron fluorophosphates. The cathode active material can be a mixture of any number of these cathode active materials.

In some aspects, the cathode 14 may include a conductive additive. Many different conductive additives, e.g., Co, Mn, Ni, Cr, Al, or Li, may be substituted or additionally added into the structure to influence electronic conductivity, ordering of the layer, stability on delithiation and cycling performance of the cathode materials. Other suitable conductive additives include graphite, carbon black, acetylene black, Ketjen black, channel black, furnace black, lamp black, thermal black, conductive fibers, metallic powders, conductive whiskers, conductive metal oxides, and mixtures thereof.

A suitable active material for the anode 18 of the lithium ion battery 10 is a lithium host material capable of incorporating and subsequently releasing the lithium ion such as graphite, a lithium metal oxide (e.g., lithium titanium oxide), hard carbon, a tin/cobalt alloy, or silicon/carbon. The anode active material can be a mixture of any number of these anode active materials. In some embodiments, the anode 18 may also include one or more conductive additives similar to those listed above for the cathode 14.

A suitable solid state electrolyte 16 of the lithium ion battery 10 includes an electrolyte material having the formula $Li_u Re_v M_w A_x O_y$, wherein Re can be any combination of elements with a nominal valance of +3 including La, Nd, Pr, Pm, Sm, Sc, Eu, Gd, Tb, Dy, Y, Ho, Er, Tm, Yb, and Lu;

M can be any combination of metals with a nominal valance of +3, +4, +5 or +6 including Zr, Ta, Nb, Sb, W, Hf, Sn, Ti, V, Bi, Ge, and Si;

A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn;

u can vary from 3-7.5;
v can vary from 0-3;
w can vary from 0-2;
x can vary from 0-2; and
y can vary from 11-12.5.

The electrolyte material may be a lithium lanthanum zirconium oxide. The electrolyte material may have the formula $Li_{6.25}La_{2.7}Zr_2Al_{0.25}O_{12}$.

Another example solid state electrolyte 16 can include any combination oxide or phosphate materials with a garnet, perovskite, NaSICON, or LiSICON phase. The solid state electrolyte 16 of the lithium ion battery 10 can include any solid-like material capable of storing and transporting ions between the anode 18 and the cathode 14.

The current collector 12 and the current collector 22 can comprise a conductive material. For example, the current collector 12 and the current collector 22 may comprise molybdenum, aluminum, nickel, copper, combinations and alloys thereof or stainless steel.

Figure 2:
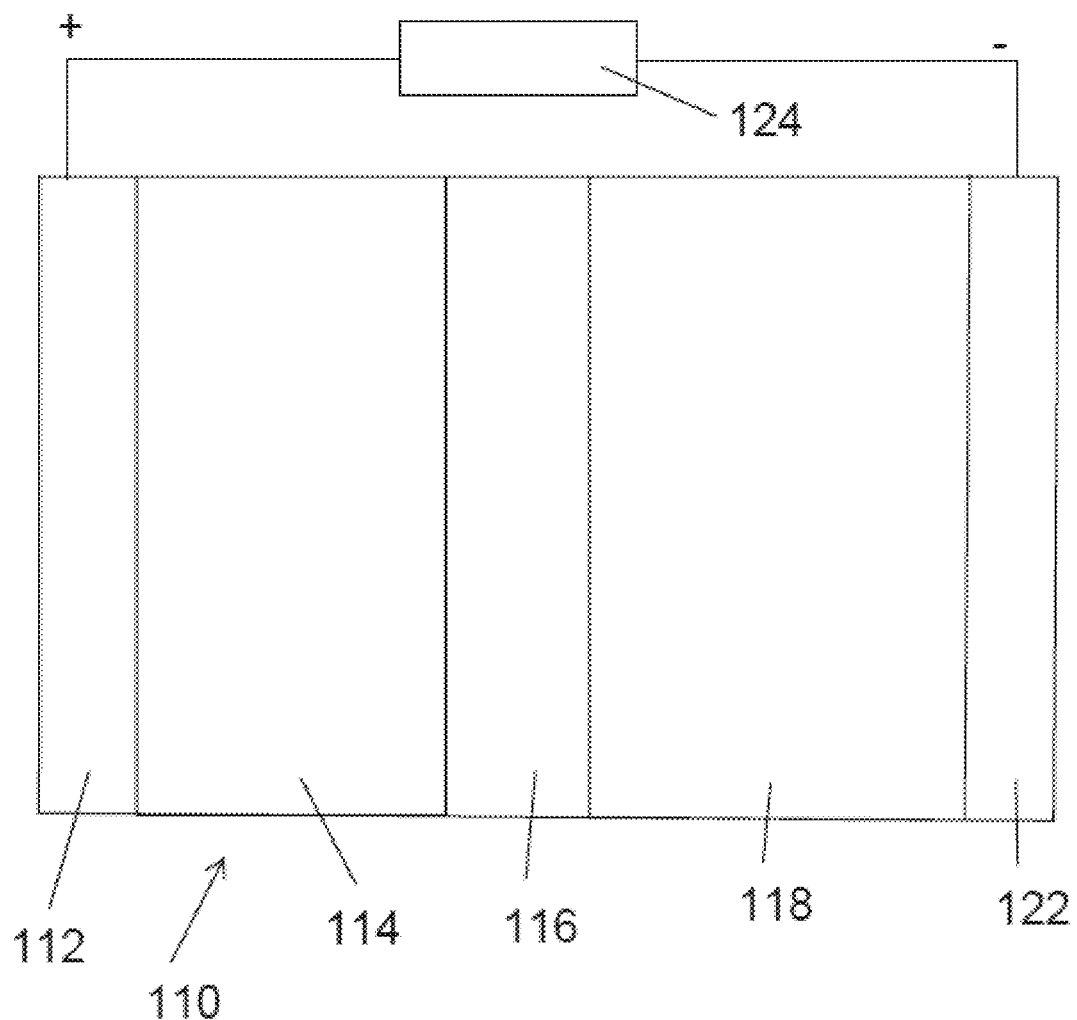
FIG. 2 is a schematic of a lithium metal battery.

FIG. 2 shows a non-limiting example application of a lithium metal battery 110 according to one embodiment of the present disclosure. The lithium metal battery 110 includes a current collector 112 in contact with a cathode 114. A solid state electrolyte 116 is arranged between the cathode 114 and an anode 118, which is in contact with a current collector 122. The current collectors 112 and 122 of the lithium metal battery 110 may be in electrical communication with an electrical component 124. The electrical component 124 could place the lithium metal battery 110 in electrical communication with an electrical load that discharges the battery or a charger that charges the battery. A suitable active material for the cathode 114 of the lithium metal battery 110 is one or more of the lithium host materials listed above for battery 10, or porous carbon (for a lithium air battery), or a sulfur containing material (for a lithium sulfur battery). A suitable active material for the anode 118 of the lithium metal battery 110 is lithium metal. A suitable solid state electrolyte material for the solid state electrolyte 116 of the lithium metal battery 110 is one or more of the solid state electrolyte materials listed above for battery 10.

Figure 3:
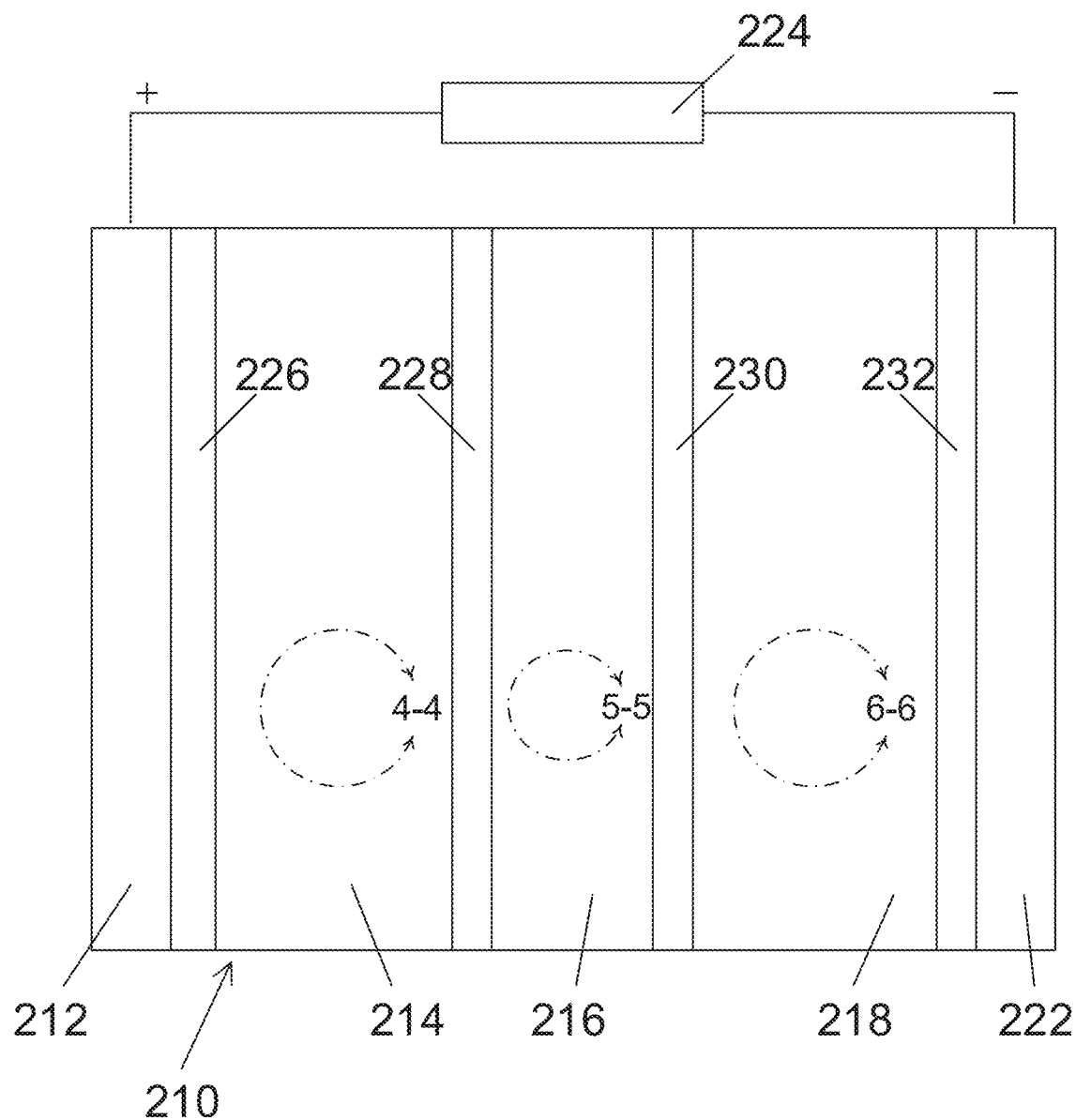
FIG. 3 is a schematic of a lithium ion battery having a stabilization coating configured to one or more constituents.

FIG. 3 shows a lithium ion battery 210 according to one embodiment of the present disclosure. In general, the lithium ion battery 210 includes a stabilization coating on one or more constituents within the lithium ion battery 210. The stabilization coatings in the present invention are tailored for solid state batteries by addressing the problem of controlling the inherent chemical reactions that occur during elevated temperatures at the interface between electrodes, solid-state electrolytes, current collectors, and conductive additives in a composite solid-state battery. Evidenced from previous discussion, a large number of elements can be substituted on the crystal structure of the solid state electrolyte. Furthermore, Li-ion cathode and anode materials can be comprised of several cations, including dopants. Thus, many cations mixed together in a composite cathode structure complicates the fabrication during sintering. Often, the discrete mixture of phases formed before sintering react with each other changing the electrochemical properties between the interfaces of the composite materials. Therefore, over-chemical reaction of the composite electrode constituents must be avoided. However, a complete lack of chemical reaction between the constituents would results in poor electrochemical interfaces. Thus, a balance in the chemical reaction between the composite cathode constituents should be achieved. The application of a coating material to stabilize interfaces by slowing, but not eliminating, the chemical reactions that will occur at elevated temperatures is one focus of the present disclosure.

Coatings have been developed for electrodes in SOA Li-ion cells but these electrodes are not processed at high temperatures. Coatings for cathodes have been disclosed, but these coatings contained sulfide materials. In general, sulfide materials are not processed at high temperatures.

Referring to FIG. 3, the lithium ion battery 210 includes a current collector 212 in contact with a stabilization coating 226. A cathode 214 is arranged between the stabilization coating 226 and a stabilization coating 228. In some embodiments, the stabilization coating 226 may be omitted to arrange the cathode 214 between the current collector 212 and the stabilization coating 228. A solid state electrolyte 216 is arranged between the stabilization coating 228 and a stabilization coating 230. In some embodiments, the stabilization coating 228 may be omitted to arrange the solid state electrolyte 216 between the cathode 214 and the stabilization coating 230.

An anode 218 is arranged between the stabilization coating 230 and a stabilization coating 232, which is in contact with a current collector 222. The stabilization coating 230 may be omitted to arrange the anode 218 between the solid state electrolyte 216 and the stabilization coating 232. Similarly, the stabilization coating 232 may be omitted to place the current collector 222 in contact with the anode 218. The current collectors 212 and 222 of the lithium ion battery 210 may be in electrical communication with an electrical component 224. The electrical component 224 could place the lithium ion battery 210 in electrical communication with an electrical load that discharges the battery or a charger that charges the battery.

Figure 4:
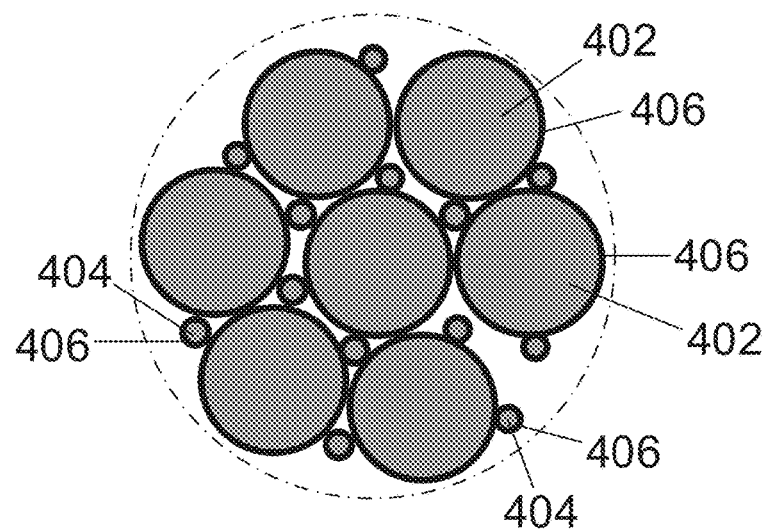
FIG. 4 is an enlarged view of a stabilization coating dispersed within the cathode of FIG. 3 taken at line 4-4.

FIG. 4 shows an enlarged, schematic illustration of an internal volume of the cathode 214 according to one embodiment of the present disclosure. The internal volume of the cathode 214 includes a lithium host material 402 and may include a conductive additive 404 dispersed throughout. In some embodiments, a stabilization coating 406 is configured to coat at least a portion of the lithium host material 402 and the conductive additive 404. In some embodiments, the stabilization coating 406 may be configured to coat the conductive additive 404 or the lithium host material 402. The stabilization coating 406 may also be omitted from coating the lithium host material 402 and the conductive additive 404.

Figure 5:
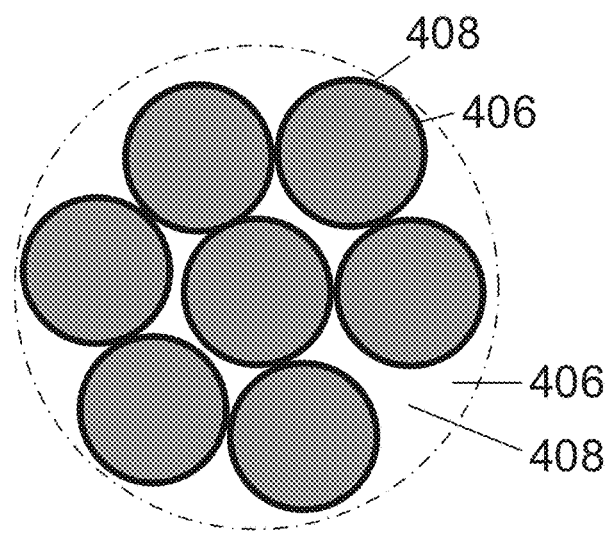
FIG. 5 is an enlarged view of a stabilization coating dispersed within the solid state electrolyte of FIG. 3 taken at line 5-5.

FIG. 5 shows an enlarged, schematic illustration of an internal volume of the solid state electrolyte 216 according to one embodiment of the present disclosure. The internal volume of the solid state electrolyte 216 includes at least one solid electrolyte material 408 capable of storing and transporting ions. In some embodiments, a stabilization coating 406 is configured to coat at least a portion of the solid electrolyte material 408. The stabilization coating 406 may also be omitted from coating the solid electrolyte material 408.

Figure 6:
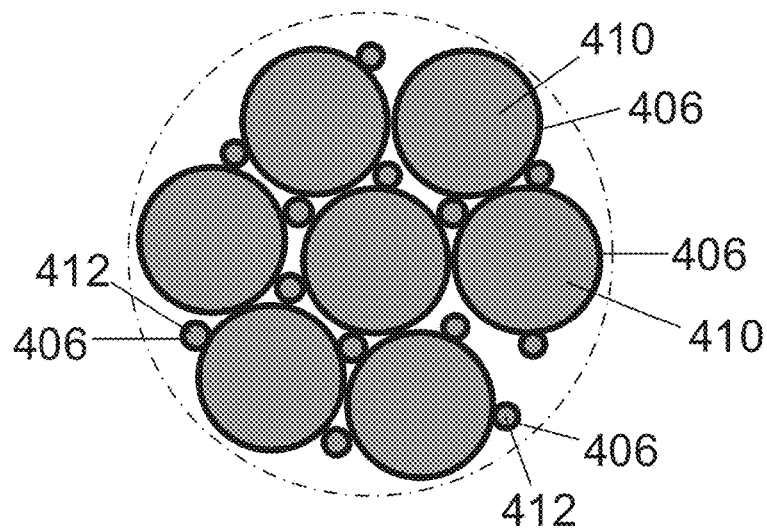
FIG. 6 is an enlarged view of a stabilization coating dispersed within the anode of FIG. 3 taken at line 6-6.

FIG. 6 shows an enlarged, schematic illustration of an internal volume of the anode 218 according to one embodiment of the present disclosure. The internal volume of the anode 218 includes a lithium host material 410 and may optionally include a conductive additive 412. In some embodiments, a stabilization coating 406 is configured to coat at least a portion of the lithium host material 410 and the conductive additive 412. In some embodiments, the stabilization coating 406 may be configured to coat the conductive additive 412 or the lithium host material 410. The stabilization coating 406 may also be omitted from coating the lithium host material 402 and the conductive additive 404.

Suitable active materials for the cathode 214 and anode 218 of the lithium ion battery 210 include one or more of the lithium host materials described above for battery 10. A suitable solid state electrolyte 216 of the lithium ion battery 210 is one or more of the solid state electrolyte materials described above for battery 10. Suitable materials for the current collector 212 and the current collector 222 are conductive materials similar to those described above for battery 10. A suitable conductive additive for the lithium ion battery 210 includes conductive additive materials similar to those described above for battery 10.

Suitable stabilization coatings for use in the lithium ion battery 210 include one or more oxides selected from boron oxide, lithium boron oxide, zinc oxide, magnesium oxide, phosphorus oxide, strontium oxide, calcium oxide, barium oxide, yttrium oxide, silicon oxide, and derivatives thereof. Non-limiting examples include $B_2O_3$, $SiO_2$, $P_2O_5$, and mixtures thereof. Other suitable stabilization coatings include oxides that have a low solubility in the solid state electrolyte, e.g. LLZO, perovskite, or NaSICON phases.

In some embodiments, the stabilization coating may be applied as an oxide precursor that decomposes to one or more oxides upon thermal treatment. Suitable oxide precursors include inorganic metal salts and organic metal salts that contain a salt capable of undergoing thermal decomposition, such as nitrate, carbonate, sulfate, hydroxide, alkoxide, carboxylate, β-diketonate, or the like. Non-limiting examples of inorganic metal salts and organic salts include magnesium methoxide, strontium acetate, zinc acetate, triisopropyl borate, methyltrimethoxy silane, barium acetate, yttrium acetate, calcium acetate, and the like. When the coating is applied as a part of a slurry additive or to a dried slurry cast film, the thermal decomposition of the coating precursors could coincide with the binder burnout step of the electrode film.

Methods for Manufacturing an Electrochemical Device

The present disclosure also relates to a method of manufacturing electrodes, solid state electrolytes, conductive additives, and current collectors for use in an electrochemical device, such as a lithium ion battery or a lithium metal battery. In general, the method relates to depositing a stabilization coating to a surface of any combination of the constituents in the electrochemical device, e.g., electrodes, solid state electrolyte, conductive additives, or current collectors during fabrication.

The stabilization coatings may be applied to the constituents of the electrochemical device in a number of ways. For example, the stabilization coating can be applied to a powder or added to a slurry prior to sintering the constituents. This results in a stabilization coating that is dispersed throughout one of the constituents similar to the schematic illustrated in FIG. 5. Alternatively, the constituents may first be formed, e.g., slurry casted and dried, and then the stabilization coating may be deposited on an external surface of the constituents before sintering. This results in a stabilization coating that is coated on an external surface of one or more of the constituents. Alternatively, the constituents may first be formed, e.g., slurry casted and sintered, and then the stabilization coating may be deposited on an external surface of the sintered constituents. This results in a stabilization coating that is coated on an external surface of one or more of the constituents.

The stabilization coatings may be deposited using sol-gel wet chemistry, atomic layer deposition (ALD), chemical vapor deposition (CVD), physical vapor deposition (PVD), or any suitable alternative coating method known to those skilled in the art.

Forming a Solid State Electrolyte for an Electrochemical Device

In one embodiment, the present disclosure relates to forming a lithium ion conducting solid state electrolyte. In general, the stabilization coatings may be deposited on the solid state electrolyte during fabrication such that the stabilization coating is dispersed throughout the solid state electrolyte, and/or such that the stabilization coating is coated on an external surface of the solid state electrolyte. A suitable solid state electrolyte material for the lithium ion conducting solid state electrolyte is one or more of the solid state electrolyte materials listed above for battery 10. Suitable stabilization coatings for the lithium ion conducting solid state electrolyte are one or more of the stabilization coatings listed above for battery 10, or one or more oxide precursor listed above for battery 10.

In one embodiment, the method includes depositing a stabilization coating on a powdered electrolyte material, and forming a slurry comprising the coated electrolyte material. The slurry is then cast on a surface to form a layer, and the layer is sintered to form the solid state electrolyte.

In another embodiment, a lithium ion conducting solid state electrolyte may be produced by first forming a slurry comprising a solid state electrolyte and a stabilization coating material. The slurry is then cast on a surface to form a layer, and the layer is sintered to form a solid state electrolyte.

In one embodiment, a lithium ion conducting solid state electrolyte may be produced by forming a slurry comprising a solid electrolyte material, casting the slurry on a surface to form a layer, and sintering the layer. A stabilization coating is then deposited on the sintered layer to form a thin film on the external surface of the solid state electrolyte.

In another embodiment, a lithium ion conducting solid state electrolyte may be produced by first forming a slurry comprising a solid electrolyte material, and casting the slurry on a surface to form a layer. A stabilization coating may then be deposited on the layer, and the layer may be sintered to form a thin film on the external surface of the solid state electrolyte.

The slurry as described in any of the preceding embodiments may be formed by mixing the electrolyte material or coated electrolyte material with an aqueous or organic solvent. Suitable solvents may include N-methyl-2-pyrrolidone (NMP) or other suitable alternatives that would be readily understood to those skilled in the art. A binder may also be added to the slurry, such as polyvinylidene fluoride (PVDF) or any suitable alternative that would be readily understood to those skilled in the art.

The layer of the solid state electrolyte as discussed in any of the preceding embodiments may be sintered to have a thickness that ranges between 1 to 100 microns. In some embodiments, the thickness of the solid state electrolyte is less than 90 microns, or less than 80 microns, or less than 70 microns, or less than 60 microns, or less than 50 microns, or less than 30 microns, or less than 20 microns.

The thin film stabilization coating on the external surface of the solid state electrolyte as discussed in any of the preceding embodiments may have a thickness that ranges from 1 angstrom to 10 microns.

Sintering of the solid state electrolyte as discussed in any of the preceding embodiments may be performed at a temperature that ranges between 500° C. to 1300° C. In some embodiments, the solid state electrolyte is sintered at a temperature between 500° C. to 1100° C., or between 550° C. to 1050° C., or between 600° C. to 1000° C., or between 650° C. to 950° C., or between 700° C. to 900° C., or between 750° C. to 850° C.

Forming an Electrode for an Electrochemical Device

In one embodiment, the present disclosure relates to forming an electrode for use in an electrochemical device, such as a lithium ion battery or a lithium metal battery. In general, the stabilization coatings may be deposited on the electrode during fabrication such that the stabilization coating is dispersed throughout the electrode, and/or such that the stabilization coating is coated on an external surface of the solid state electrolyte. A suitable lithium host material for the electrode is one or more of the lithium host materials listed above for battery 10. Suitable stabilization coatings for the electrodes are one or more of the stabilization coatings listed above for battery 10, or one or more oxide precursor listed above for battery 10.

In one embodiment, the method for forming an electrode includes depositing a stabilization coating on a powdered lithium host material, and forming a slurry comprising the coated lithium host material. The slurry is then cast on a surface to form a layer, and the layer is sintered to form the electrode.

In another embodiment, the electrode may be produced by forming a slurry comprising a lithium host material and a stabilization coating material. The slurry is then cast on a surface to form a layer, and the layer is sintered to form an electrode.

In one embodiment, the electrode may be produced by forming a slurry comprising a lithium host material, casting the slurry on a surface to form a layer, and sintering the layer. A stabilization coating is then deposited on an external surface of the sintered layer to form a thin film. The thin film may then be sintered to complete forming the electrode.

In another embodiment, the electrode may be produced by forming a slurry comprising a lithium host material, and casting the slurry on a surface to form a layer. A stabilization coating is then deposited on an external surface of the layer to form a thin film, and the layer is sintered to form the electrode.

The slurry as described in any of the preceding embodiments may be formed by mixing the lithium host material or coated lithium host material with an aqueous or organic solvent. Suitable solvents may include N-methyl-2-pyrrolidone (NMP) or other suitable alternatives that would be readily understood to those skilled in the art. A binder may also be added to the slurry, such as polyvinylidene fluoride (PVDF) or any suitable alternative that would be readily understood to those skilled in the art. A conductive additive may also be added to the slurry. In some embodiments, the conductive additive is coated with a stabilization coating. A suitable conductive additive for the electrode is one or more of the conductive additives listed above for battery 10.

The layer of the electrode as discussed in any of the preceding embodiments may be sintered to have a thickness that ranges between 1 to 200 microns. In some embodiments, the thickness of the electrode is less than 175 microns, or less than 150 microns, or less than 125 microns, or less than 100 microns, or less than 75 microns, or less than 50 microns.

The thin film stabilization coating on the external surface of the electrode as discussed in any of the preceding embodiments may have a thickness that ranges from 1 angstrom to 10 microns.

Sintering of the electrode as discussed in any of the preceding embodiments may be performed at a temperature that ranges between 108° C. to 1300° C. In some embodiments, the electrode is sintered at a temperature between 500° C. to 1100° C., or between 200° C. to 1000° C., or between 300° C. to 900° C., or between 400° C. to 800° C., or between 500° C. to 700° C.

Forming a Stabilized Current Collector for an Electrochemical Device

In one embodiment, the present disclosure relates to a method for coating a current collector for use in an electrochemical device, such as a lithium ion battery or a lithium metal battery. The method includes depositing a stabilization coating material onto the current collector, and heating the current collector to form a stabilized current collector. A suitable current collector is one or more current collector listed above for battery 10. A suitable stabilization coating includes one or more stabilization coating listed above for battery 10, or one or more oxide precursor listed above for battery 10.

Forming a Stabilized Conductive Additive for an Electrochemical Device

The present disclosure also relates to a method for forming a conductive additive for an electrochemical device. The method include depositing a stabilization coating material onto a conductive material, and sintering the coated conductive material. The conductive material may then be added to a powder or a slurry during the formation of an electrode.

A suitable stabilization coating includes one or more stabilization coating listed above for battery 10, or one or more oxide precursor listed above for battery 10. A suitable conductive additive includes one or more conductive additive material listed above for battery 10.

Forming an Electrochemical Device

The present disclosure also relates to a method for forming an electrochemical device. In one embodiment, the method includes casting a slurry that includes a lithium host material on a surface to form a first layer, and forming a second layer by casting a slurry that includes a solid state electrolyte on the first layer. A third layer is then formed by casting a slurry that includes a second lithium host material on the second layer to form a layered structure. The layered structure is then sintered to form the electrochemical device. The lithium host material, the solid state electrolyte, or the second lithium host material may be pre-coated with a stabilization coating, e.g. pre-coating a powder as described above, prior to forming the first layer, the second layer, or the third layer.

In another embodiment, a method for forming an electrochemical device includes casting a slurry that includes a lithium host material on a surface to form a first layer, and forming a second layer by casting a slurry that includes a solid state electrolyte on the first layer. A third layer is then formed by casting a slurry that includes a second lithium host material on the second layer to form a layered structure. The layered structure is then sintered to form the electrochemical device. A stabilization coating may be added to one or more of the first slurry, the second slurry, and the third slurry prior to sintering.

A suitable stabilization coating includes one or more stabilization coating listed above for battery 10, or one or more oxide precursor listed above for battery 10. A suitable lithium host material for the electrode is one or more of the lithium host materials listed above for battery 10. A suitable solid state electrolyte material for the lithium ion conducting solid state electrolyte is one or more of the solid state electrolyte materials listed above for battery 10.

Sintering of the electrochemical device as discussed in any of the preceding embodiments may be performed at a temperature that ranges between 108° C. to 1300° C. In some embodiments, the electrode is sintered at a temperature between 200° C. to 1100° C., between 200° C. to 1000° C., or between 300° C. to 900° C., or between 400° C. to 800° C., or between 500° C. to 700° C.

The first layer and the third layer as discussed in any of the preceding embodiments may have a thickness in the range of 1 to 200 microns. In some embodiments, the thickness of the electrode is less than 175 microns, or less than 150 microns, or less than 125 microns, or less than 100 microns, or less than 75 microns, or less than 50 microns. The second layer as discussed in any of the preceding embodiments may have a thickness that ranges between 1 to 100 microns. In some embodiments, the thickness of the solid state electrolyte is less than 90 microns, or less than 80 microns, or less than 70 microns, or less than 60 microns, or less than 50 microns, or less than 30 microns, or less than 20 microns.

EXAMPLES

The following Examples have been presented in order to further illustrate the invention and are not intended to limit the invention in any way.

Example 1

Stabilization coating materials in the form of metal oxide precursors may be deposited and sintered onto metallic current collectors prior to the current collectors supporting solid-state electrodes and solid-state electrolyte layers. Magnesium methoxide, strontium acetate, zinc acetate, tri-isopropyl borate, methyltrimethoxy silane, barium acetate, yttrium acetate, zinc carboxylate and calcium acetate were each deposited onto a current collector using sol-gel spin coating. Table 1 summarizes the amounts of materials used during the stabilization coating process. Once the materials were combined, the mixture was then heated at 500° C. This ensured the formation of oxide layers. These current collectors were then used to support solid-state battery electrode and electrolyte layers during sintering.

TABLE 1

Summary of the amount of stabilization coating materials used to coat current collectors.

| Sample | Metal Oxide Precursor | Approximate Thickness (nm) | Current Collector | Approximate Thickness (microns) |
|---|---|---|---|---|
| 1 | Magnesium | 50-200 | Stainless Steel | 25 |
| 2 | methoxide | 50-200 | Nickel | 25, 50 |
| 3 |  | 50-200 | Molybdenum | 50 |
| 4 | Strontium acetate | 50-200 | Stainless Steel | 25 |
| 5 |  | 50-200 | Nickel | 25, 50 |
| 6 |  | 50-200 | Molybdenum | 50 |
| 7 | Zinc acetate | 50-200 | Stainless Steel | 25 |
| 8 |  | 50-200 | Nickel | 25, 50 |
| 9 |  | 50-200 | Molybdenum | 50 |
| 10 | Tri-isopropyl | 50-200 | Stainless Steel | 25 |
| 11 | borate | 50-200 | Nickel | 25, 50 |
| 12 |  | 50-200 | Molybdenum | 50 |
| 13 | Methyltrimethoxy | 50-200 | Stainless Steel | 25 |
| 14 | silane | 50-200 | Nickel | 25, 50 |
| 15 |  | 50-200 | Molybdenum | 50 |
| 16 | Barium acetate | 50-200 | Stainless Steel | 25 |
| 17 |  | 50-200 | Nickel | 25, 50 |
| 18 |  | 50-200 | Molybdenum | 50 |
| 19 | Yttrium acetate | 50-200 | Stainless Steel | 25 |
| 20 |  | 50-200 | Nickel | 25, 50 |
| 21 |  | 50-200 | Molybdenum | 50 |
| 22 | Calcium acetate | 50-200 | Stainless Steel | 25 |
| 23 |  | 50-200 | Nickel | 25, 50 |
| 24 |  | 50-200 | Molybdenum | 50 |

Example 2

Magnesium methoxide, methytrimethoxy silane, and yttrium butoxide were deposited using sol-gel wet chemistry onto 2.2-3 micron nickel powder conductive additive and 10 micron NMC cathode without heat treatment prior to powder blend formation. Zinc carboxylate was deposited sol-gel wet chemistry onto 2.2-3 micron nickel conductive additive and was heat treated at 500° C. to ensure oxide formation prior to powder blend formation.

Example 3

A sintered composite cathode was prepared with three distinct phases corresponding to LLZO garnet solid electrolyte, conductive additive (Ni metal), and active material (NiO). The Ni conductive additive was coated as a powder with magnesium oxide (MgO) from a magnesium alkoxide (magnesium methoxide) in a sol-gel process prior to powder blend formation.

Figure 7:
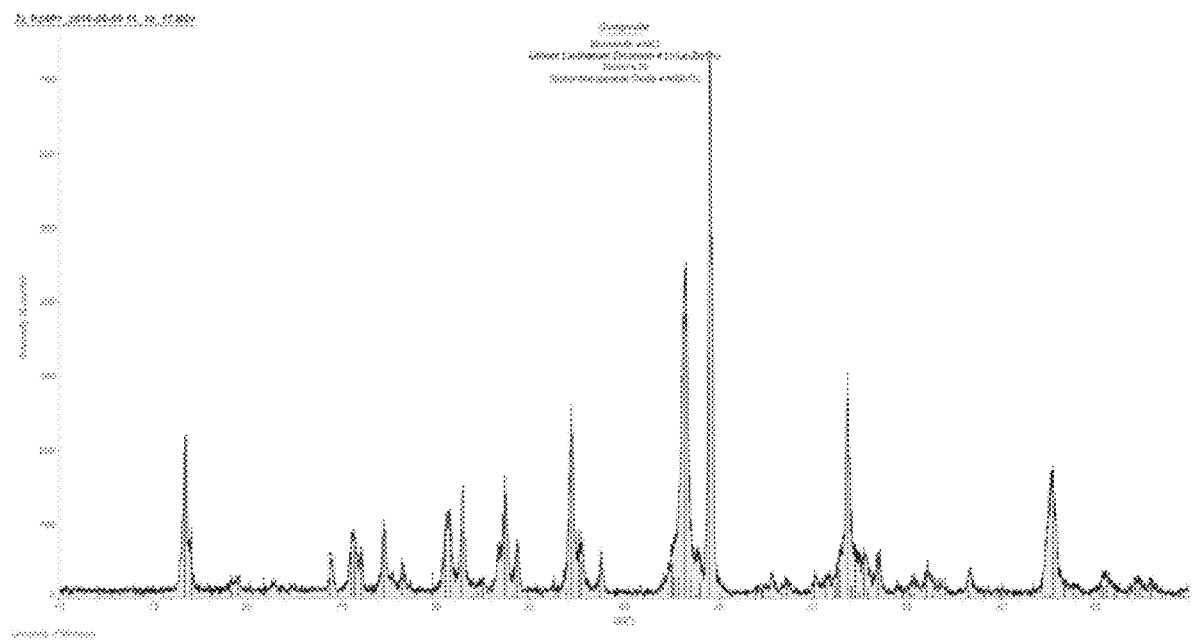
FIG. 7 is an XRD pattern for a sintered composite cathode showing LLZO electrolyte phase, conductive additive (Ni), and active materials.

FIG. 7 shows an XRD plot of a sintered composite, showing the three distinct phases corresponding to an LLZO garnet solid electrolyte, conductive additive (Ni metal), and active material (NiO).

Figure 8A:
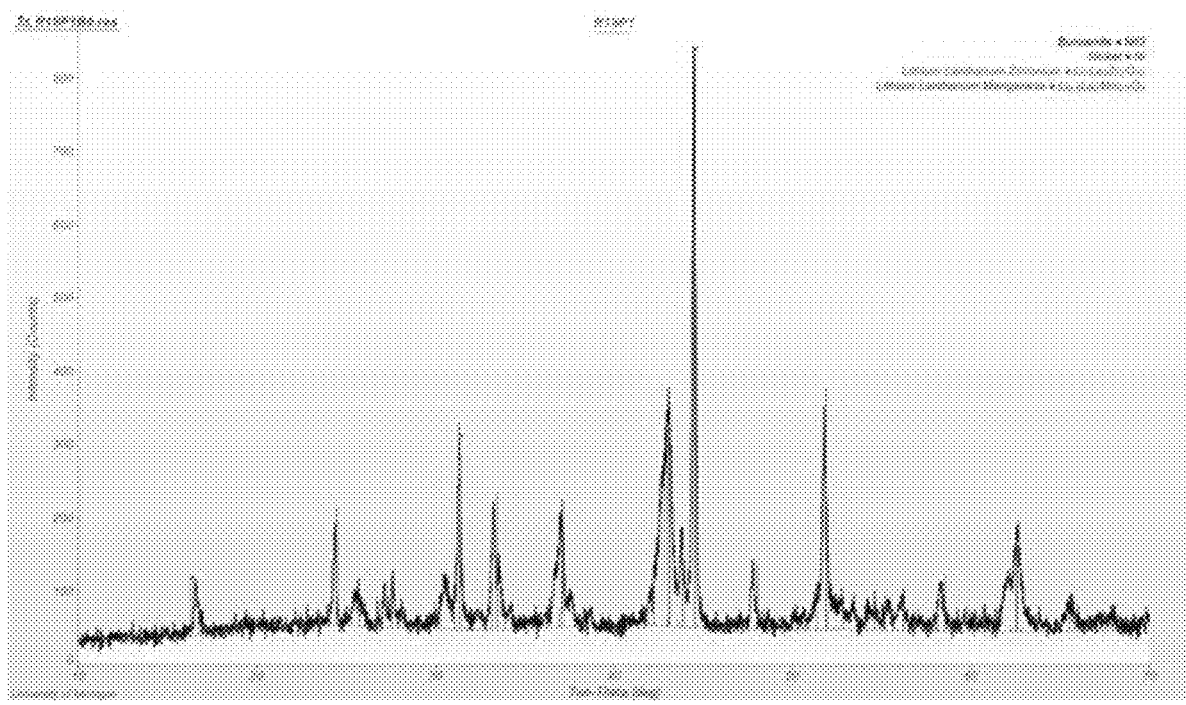
FIG. 8A shows an XRD plot of a powder blend without a coating on a conductive additive.

FIG. 8A shows an XRD plot of the same powder blend processed under the same conditions but without a coating on the conductive additive.

Figure 8B:
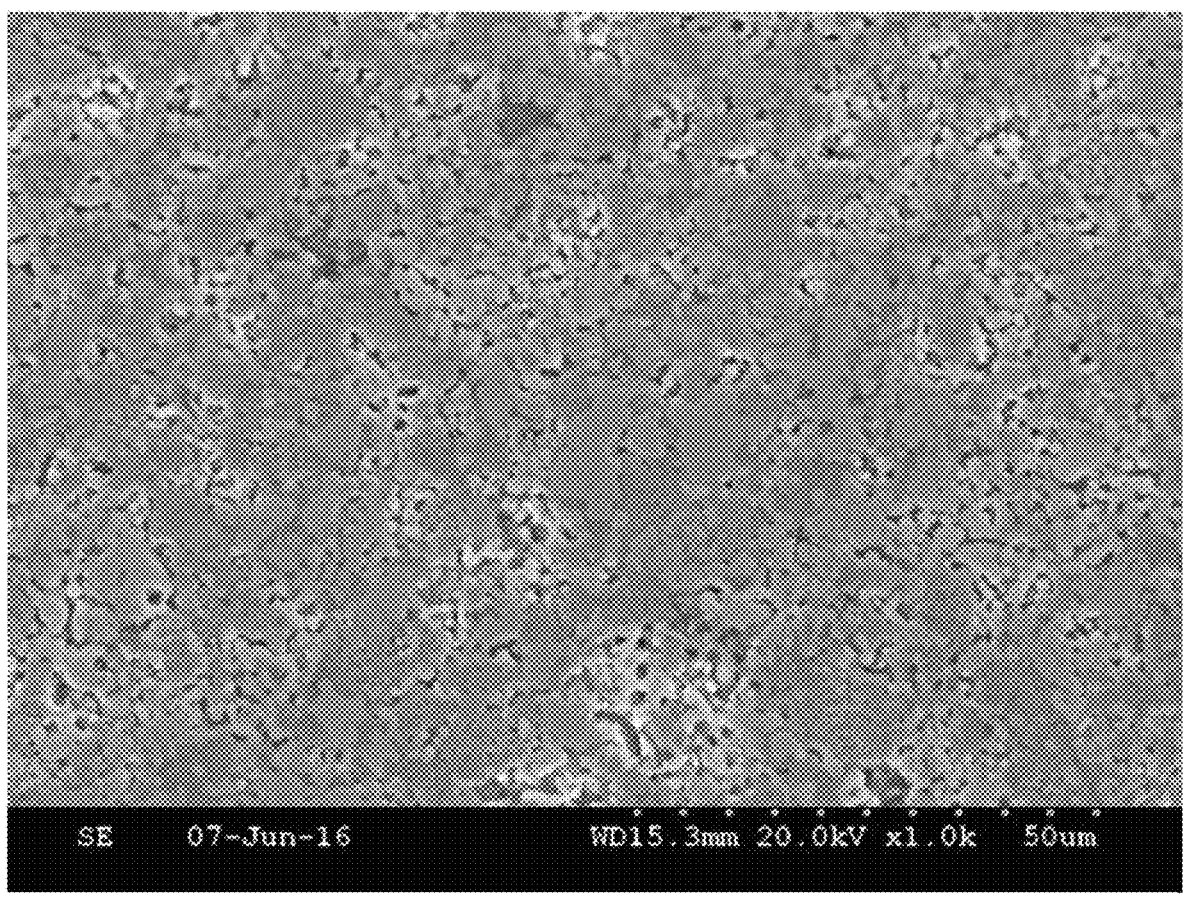
FIG. 8B shows an SEM image of a composite cathode where regions of different morphologies can be observed, supporting that the MgO coating stabilized chemical reactions at the interfaces.

FIG. 8B shows an SEM image of the same composite cathode where regions of different morphologies can be observed, supporting that the MgO coating stabilized the chemical reactions at the interfaces.

Example 4

Figure 9:
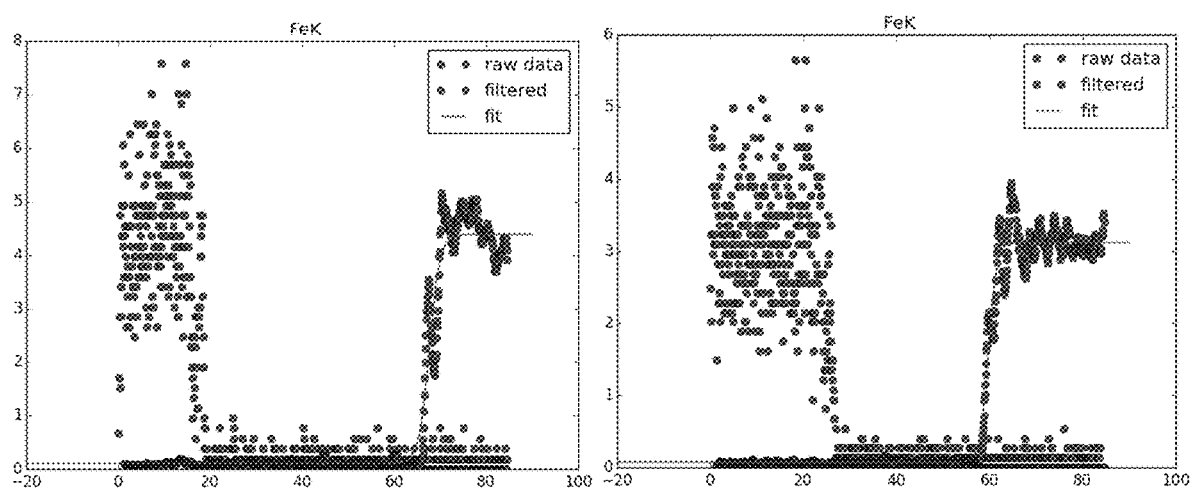
FIG. 9 is (a, left) a plot of a Fe—K shell EDS line scan for an uncoated stainless steel current collector control and (b, right) a plot of a Fe—K shell EDS line scan for a $Y_2O_3$ coated stainless steel current collector. Blue dots are the raw data, green dots are a moving average of the raw data, and the red line is the sigmoidal line fit to estimate interdiffusion. The coefficient values for the fitted line are annotated on the plot where a higher number represents less interdiffusion.
Figure 10:
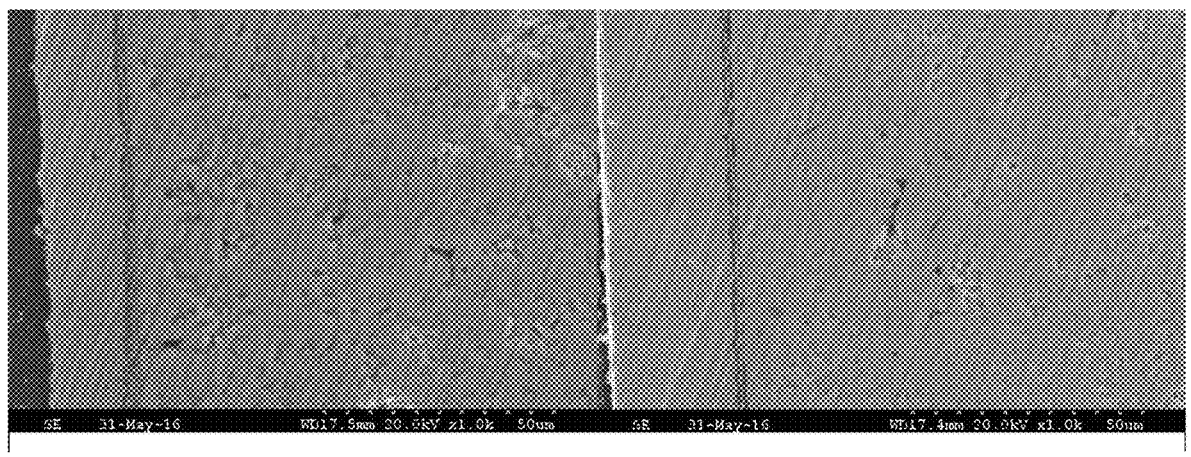
FIG. 10 is in (a, left), a secondary SEM image of a solid electrolyte layer bonded to an uncoated stainless steel current collector control, and in (b, right), a secondary SEM image of a solid electrolyte layer bonded to a $Y_2O_3$ coated stainless steel current collector. A reduction in the thickness of the native oxide layer which forms on stainless steel can be qualitatively observed with the coated current collector shown in (b).

Yttrium acetate was prepared into a stable sol and deposited onto 25 micron stainless steel by sol-gel wet chemistry and subsequent spin coating and heat treated at 500° C. to ensure oxide formation. Separately, a free standing LLZO electrolyte tape was produced by slurry casting. The LLZO tape was placed on the $Y_2O_3$ coated stainless steel current collector and subjected to sintering. The resulting sample was mounted in in cross-section for EDS analysis. A similar sample following the same procedure with the coating step omitted was also produced. FIG. 9 shows an EDS line scan of a current collector and LLZO interface. FIG. 9a is a plot of an uncoated stainless steel metal current collector, and FIG. 9b is a plot of a stainless steel current collector coated with a $Y_2O_3$ stabilization material. A sigmoidal line fit may be used on the concentration profiles to estimate the degree of interdiffusion. A lower exponent corresponds to more interdiffusion in an EDS line scan. The exponent values are annotated on the figure, and indicate that the metal oxide coating reduced the amount of interdiffusion. FIG. 10 is a secondary SEM image of an uncoated stainless steel current collector and LLZO interface (10a), and a current collector coated with a $Y_2O_3$ stabilization material (10b). A qualitative reduction in the native oxide layer can be observed when the current collector is coated with a stabilization layer.

Example 5

Figure 11:
FIG. 11 is a dark field STEM micrograph with overlaid EDS spectroscopy showing $Li_3BO_3$ coating of $LiNi_{1/3}Mn_{1/3}Co_{1/3}O_2$ active material powder.

Particles of $LiNi_{1/3}Mn_{1/3}Co_{1/3}O_2$ active material were coated by $Li_3BO_3$ using atomic layer deposition (ALD). FIG. 11 shows a dark field STEM micrograph with overlaid EDS linescan. The O K and B K signals extend beyond the Ni K, Co K, or Mn K signals in the particle core, indicating coverage of the $LiNi_{1/3}Mn_{1/3}Co_{1/3}O_2$ active material particles by $Li_3BO_3$.

REFERENCES

[1] DOE EERE Vehicle Technology Office, EV everywhere grand challenge: http://energy.gov/eere/vehicles/ev-everywhere-grand-challenge-does-10-year-vision-plug-electric-vehicles.
[2] V. Thangadurai, W. Weppner, *Adv. Funct. Mater.* 2005, 15, 107.
[3] V. Thangadurai, W. Weppner, *Ionics* 2006, 12, 81.
[4] R. Murugan, V. Thangadurai, W. Weppner, *Angew. Chem. Inter. Ed.* 2007, 46, 7778.
[5] M. Xu, M. S. Park, J. M. Lee, T. Y. Kim, Y. S. Park, E. Ma, *Phys. Rev. B* 2012, 85, 052301
[6] T. Thompson, A. Sharafi, M. D. Johannes, A. Huq, J. L. Allen, J. Wolfenstine, J. Sakamoto, *Advanced Energy Materials* 2015, 11, 1500096.
[7] E. Rangasamy, J. Wolfenstine, J. L. Allen, J. Sakamoto, *Journal of Power Sources* 2013, 230, 261.
[8] S. Mukhopadhyay, T. Thompson, J. Sakamoto, A. Huq, J. Wolfenstine, J. L. Allen, N. Bernstein, D. A. Stewart, M. D. Johannes, *Chemistry of Materials* 2015, 27, 3658.
[9] Yamamura, Y., Hattori, T., Yoshida, T., Honda, A. and Sato, Y., Ngk Insulators, Ltd., 2014. Ceramic material and preparation method therefor. U.S. Pat. No. 8,841,033.
[10] Weppner, W. and Thangadurai, V. 2012. Chemically stable solid lithium ion conductor. U.S. Pat. No. 8,092,941.
[11] Weppner, W. and Murugan, R., Basf Se, 2014. Solid ion conductor which has a garnet-like crystal structure and has the stoichiometric composition L7+ XAXG3–XZr2O12. U.S. Pat. No. 8,658,317.

The citation of any document or reference is not to be construed as an admission that it is prior art with respect to the present invention.

Thus, the invention provides electrochemical devices, such as lithium ion battery electrodes, lithium ion conducting solid-state electrolytes, and solid-state lithium ion batteries including these electrodes and solid-state electrolytes. This invention also provides to methods for making such electrochemical devices.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment", "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for forming a lithium ion conducting solid-state electrolyte, the method comprising:
    (a) depositing a stabilization coating on a powdered electrolyte material;
    (b) forming a slurry comprising the coated electrolyte material;
    (c) casting the slurry on a surface to form a layer; and
    (d) sintering the layer to form the solid-state electrolyte, wherein the stabilization coating is applied as an oxide precursor that decomposes to one or more oxides upon thermal treatment.

2. The method of claim 1 wherein:
    step (a) comprises depositing the stabilization coating using sol-gel wet chemistry, atomic layer deposition, chemical vapor deposition, or physical vapor deposition.

3. The method of claim 1 wherein:
    the stabilization coating comprises one or more oxides selected from boron oxide, lithium boron oxide, zinc oxide, magnesium oxide, phosphorus oxide, strontium oxide, calcium oxide, barium oxide, yttrium oxide, or silicon oxide.

4. The method of claim 1 wherein:
the stabilization coating on the solid-state electrolyte comprises a mixture of $B_2O_3$, $SiO_2$, and $P_2O_5$.

5. The method of claim 1 wherein:
the electrolyte material is selected from the group consisting of any combination oxide or phosphate materials with a garnet, perovskite, NaSICON, or LiSICON phase.

6. The method of claim 1 wherein:
the electrolyte material has the formula $Li_u Re_v M_w A_x O_y$, wherein
  Re can be any combination of elements with a nominal valance of +3 including La, Nd, Pr, Pm, Sm, Sc, Eu, Gd, Tb, Dy, Y, Ho, Er, Tm, Yb, and Lu;
  M can be any combination of metals with a nominal valance of +3, +4, +5 or +6 including Zr, Ta, Nb, Sb, W, Hf, Sn, Ti, V, Bi, Ge, and Si;
  A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn;
  u can vary from 3-7.5;
  v can vary from 0-3;
  w can vary from 0-2;
  x can vary from 0-2; and
  y can vary from 11-12.5.

7. The method of claim 1 wherein:
the electrolyte material is a lithium lanthanum zirconium oxide.

8. The method of claim 1 wherein:
step (d) comprises sintering the layer at a temperature in a range of 500° C. to 1300° C.

9. The method of claim 1 wherein:
the layer has a thickness in a range of 1 to 100 microns.

10. The method of claim 1 wherein:
the electrolyte material has the formula $Li_{6.25}La_{2.7}Zr_2Al_{0.25}O_{12}$.

11. The method of claim 1 wherein:
the stabilization coating on the solid-state electrolyte comprises $B_2O_3$.

12. The method of claim 1 wherein:
the stabilization coating on the solid-state electrolyte comprises $SiO_2$.

13. The method of claim 1 wherein:
the stabilization coating on the solid-state electrolyte comprises $P_2O_5$.

14. The method of claim 1 wherein:
the stabilization coating has a thickness in a range of 1 angstrom to 10 microns.

15. The method of claim 1 wherein:
the solid-state electrolyte has a thickness of less than 50 microns.

16. The method of claim 1 wherein:
the oxide precursor comprises a salt that is capable of undergoing thermal decomposition.

17. The method of claim 16 wherein:
the salt is selected from the group consisting of nitrates, carbonates, sulfates, hydroxides, alkoxides, carboxylates, and ß-diketonates.

18. The method of claim 16 wherein:
the salt is selected from the group consisting of methoxides, acetates, borates, and silanes.

19. The method of claim 1 wherein:
the oxide precursor is a plurality of oxide precursors that form one or more oxides upon thermal treatment.

* * * * *